US012585319B2

(12) United States Patent
Holtham et al.

(10) Patent No.: US 12,585,319 B2
(45) Date of Patent: Mar. 24, 2026

(54) SYSTEM AND METHOD OF ADAPTIVE TRANSMITTER FOR AN OBJECT DETECTION SYSTEM

(71) Applicant: Xtract One Technologies Inc., Toronto (CA)

(72) Inventors: Elliot Mark Holtham, Vancouver (CA); Nathaniel Couture, Fredericton (CA); Allison Brown, Calgary (CA); Nevine Demitri, Toronto (CA); Ashik Mohideen, Toronto (CA); Harshit Madaan, Toronto (CA); Joshua Douglas, Goffstown, NH (US)

(73) Assignee: XTRACT ONE TECHNOLOGIES INC.

( * ) Notice: Subject to any disclaimer, the term of this patent is extended or adjusted under 35 U.S.C. 154(b) by 29 days.

(21) Appl. No.: 18/659,697

(22) Filed: May 9, 2024

(65) Prior Publication Data

US 2024/0377875 A1     Nov. 14, 2024

Related U.S. Application Data

(60) Provisional application No. 63/501,139, filed on May 9, 2023.

(51) Int. Cl.
G06F 1/3231      (2019.01)
H04B 1/3827      (2015.01)

(52) U.S. Cl.
CPC ......... G06F 1/3231 (2013.01); H04B 1/3838 (2013.01); *G06V 2201/05* (2022.01)

(58) Field of Classification Search
CPC .. G06F 1/3231; G06V 2201/05; H04B 1/3838
See application file for complete search history.

(56) References Cited

U.S. PATENT DOCUMENTS

| | | | | |
|---|---|---|---|---|
| 8,319,170 B2 * | 11/2012 | Alameh | ............ | H04W 52/0251 |
| | | | | 250/221 |
| 8,775,103 B1 * | 7/2014 | Jayaraj | ................. | H03K 17/955 |
| | | | | 702/57 |
| 8,934,937 B1 * | 1/2015 | Zehr | ..................... | H04W 52/36 |
| | | | | 455/575.4 |

(Continued)

*Primary Examiner* — Thomas D Alunkal

(57) ABSTRACT

A system and method of an adaptive transmitter for an object detection system having an adaptive transmitter that enables changing power levels to meet health and safety requirements based on proximity information. Adaptive transmitters are placed on gateway pillars of a multi-sensor gateway system using an adaptive transmitter configuration. A patron passes through the center of the gate and always stays far enough away from the transmitters such that the transmitter operates in a high field configuration and remain under appropriate health and safety levels. A patron can also move close to a pillar and enter the second proximity boundary wherein the system would automatically switch to a lower power setting to remain within the appropriate health guidelines. A two-mode power level configuration can be extended to a continuous mode configuration where the power levels are adjusted dynamically. Furthermore, power consumption can be reduced and battery lifetime prolonged.

20 Claims, 6 Drawing Sheets

(56)     References Cited

U.S. PATENT DOCUMENTS

| | | | |
|---|---|---|---|
| 8,954,099 B2 * | 2/2015 | Forutanpour | G06F 1/163 |
| | | | 345/158 |
| 9,030,320 B2 * | 5/2015 | Reinpoldt | G06V 20/52 |
| | | | 340/552 |
| 9,823,377 B1 * | 11/2017 | Kuznetsov | G01V 8/10 |
| 9,893,554 B2 * | 2/2018 | Bell | H04B 1/3838 |
| 10,448,342 B1 * | 10/2019 | Schwent | H04W 52/30 |
| 2013/0141241 A1 * | 6/2013 | Chen | G06K 7/10316 |
| | | | 340/572.1 |
| 2015/0136975 A1 * | 5/2015 | Sugaya | H01J 49/049 |
| | | | 250/288 |
| 2017/0273034 A1 * | 9/2017 | Colombi | H04B 1/38 |

* cited by examiner

SYSTEM AND METHOD OF ADAPTIVE TRANSMITTER FOR AN OBJECT DETECTION SYSTEM

CROSS REFERENCE TO RELATED APPLICATIONS

This application claims priority to and the benefits of U.S. Provisional Application Ser. No. 63/501,139, entitled "SYSTEM AND METHOD OF ADAPTIVE TRANSMITTER FOR AN OBJECT DETECTION SYSTEM" filed on May 9, 2023, the disclosure of which is incorporated herein by reference in its entirety.

BACKGROUND

The embodiments described herein relate to security and surveillance, in particular, technologies related to threat detection systems.

An exemplary threat detection system using a gateway deploys a single machine learning model that has been trained to detect threat objects of guns and knives, passing between the pillars of a multi-sensor gateway (MSG) threat detection system.

MSG systems have health and safety requirements which must be met including general and operational guidelines. In some MSG systems, static magnetic field values and frequency dependent levels must be met. Because of these requirements, the field strength that can be produced with the static magnet array and transmitter loops are not as high as may be desired. Ideally, the MSG systems would have stronger field values since this would induce a greater response in the objects (i.e., magnetization and eddy currents) which would make it easier to detect the objects and improve the signal to noise ratios of the measurements.

One of the challenges is that because of the geometric decay of the source fields, the fields that are produced drop in strength as the object moves away from the source fields (i.e., both static magnet field or field from transmitter loop). To satisfy health and safety requirements through the usable region of the gateway, the field at the midpoint of the pillars (i.e., where most people walk) is weaker in order to simultaneously satisfy the field being under the health at safety limit at points closer to the source field. Furthermore, as the patron moves forward and backwards from the plane between the two pillars, the field attenuates further meaning the signal levels are decreased making it harder to detect objects.

This is particularly true for small objects such as small guns and knives, which are often the most important targets. For example, if the field strength is at a maximum level near the pillar and source field, the field might be less than 1% of that value in the middle of the gate and 1 meter in front of the gateway as the patron is approaching the gateway.

Current gateway width is limited generally by two factors: the receiver object distance, and the ability to generate a sufficiently large field at the center of the gateway while still meeting health and safety guidelines through the rest of the gateway. By having proximity sensors and scaling the field strength depending on patron/pillar distance, a larger gateway width could be used and still induce the same magnitude currents or magnetization within the object. The receiver object distance would still be increased at larger gateway offsets, but one of the main factors for performance drop offs at larger pillar offsets would be mitigated.

Furthermore, threat detection gateways may need to be wireless and battery powered to be able to be operated at outdoor events, and be easily set up for non-permanent locations. During an event there are several different periods that can be defined by different patron throughput. The first phase is the set-up phase where the operator needs to set up the system in the required location and checking it is operating correctly. During that time no patrons are passing through the gateway, the operator may pass to check the systems functionality. In the next phase, patrons start trickling in, in a low throughput scenario. Then comes the high throughput phase, where patrons are walking through the gateway in high numbers. After that comes another low throughput phase of patrons who are coming later.

An active threat detection system operates based on sending a current through a transmission loop, and receiver coils receiving the primary and secondary backscatter from the object. The transmission loop consumes a significant portion of power from the system. For the lower throughput phases the transmission loop does not need to fire constantly to reduce power and prolong battery life to be able to support longer events. According to the disclosure, even in the higher throughput time intervals, the transmitter may not always need to fire all the time as it's unlikely all events will have a patron within the gate at all times.

It may be desirable to provide a configurable transmitter to address the aforementioned concerns. Furthermore, it is also desirable to have changing power levels based on presence of patrons in the gateway to reduce power consumption and prolong battery life and detect presence and distance of the patron within the gate

SUMMARY

A system and method of an adaptive transmitter for an object detection system. The adaptive transmitter enables changing power levels to meet health and safety requirements based on proximity information. Adaptive transmitters are placed on gateway pillars of a multi-sensor gateway system using an adaptive transmitter configuration. A patron passes through the center of the gate and always stays far enough away from the transmitters such that the transmitter operates in a high field configuration and remain under appropriate health and safety levels. A patron can also move close to a pillar and enter the second proximity boundary wherein the system would automatically switch to a lower power setting to remain within the appropriate health guidelines. This concept two mode power level configuration can be easily extended to a continuous mode configuration where the power levels are adjusted dynamically to always remain below, but near any health and safety requirements.

The gateway further comprises the ability to change the power levels by examining the first part of the walkthrough data time-series. The gateway may also intelligently detect the presence of patrons and optimizes the transmission current through the transmission loop based on the amount of patrons present whereby the power consumption can be reduced and battery lifetime prolonged.

DETAILED DESCRIPTION

Embodiments of this disclosure include a system that places the computing at the edge by including an onboard processor. Further, different peripherals are added to present the alert information to the security guard, as well as control the throughput rate and operations. This system benefits the patron experience and provides added value to the customer in terms of managing throughput and enhancing security.

Figure 1A:
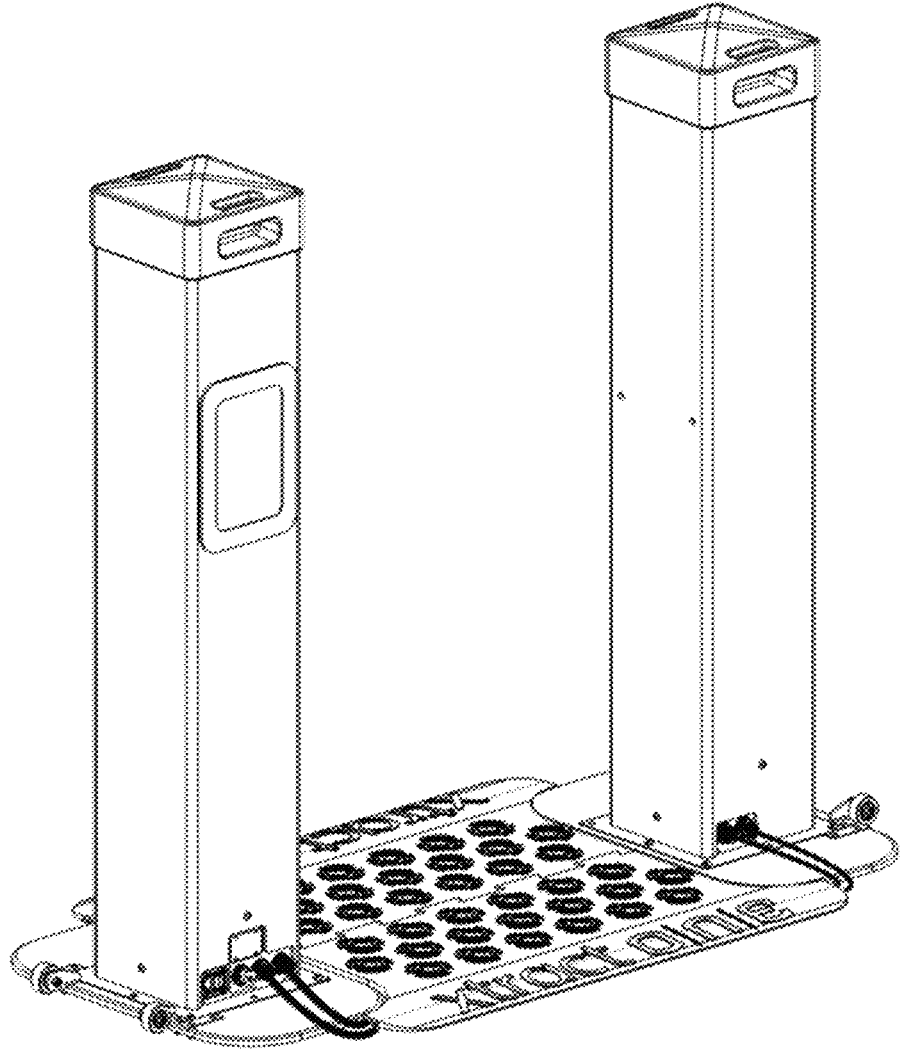
FIGS. 1A-1C are diagrams illustrating an exemplary threat detection system.
Figure 1B:
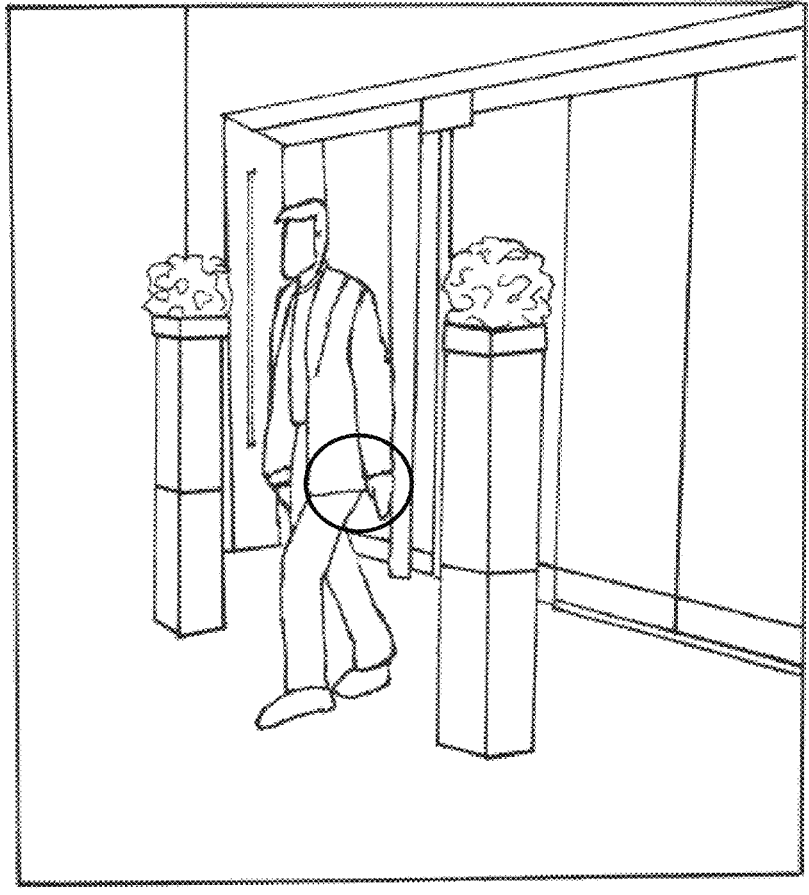
Figure 1C:
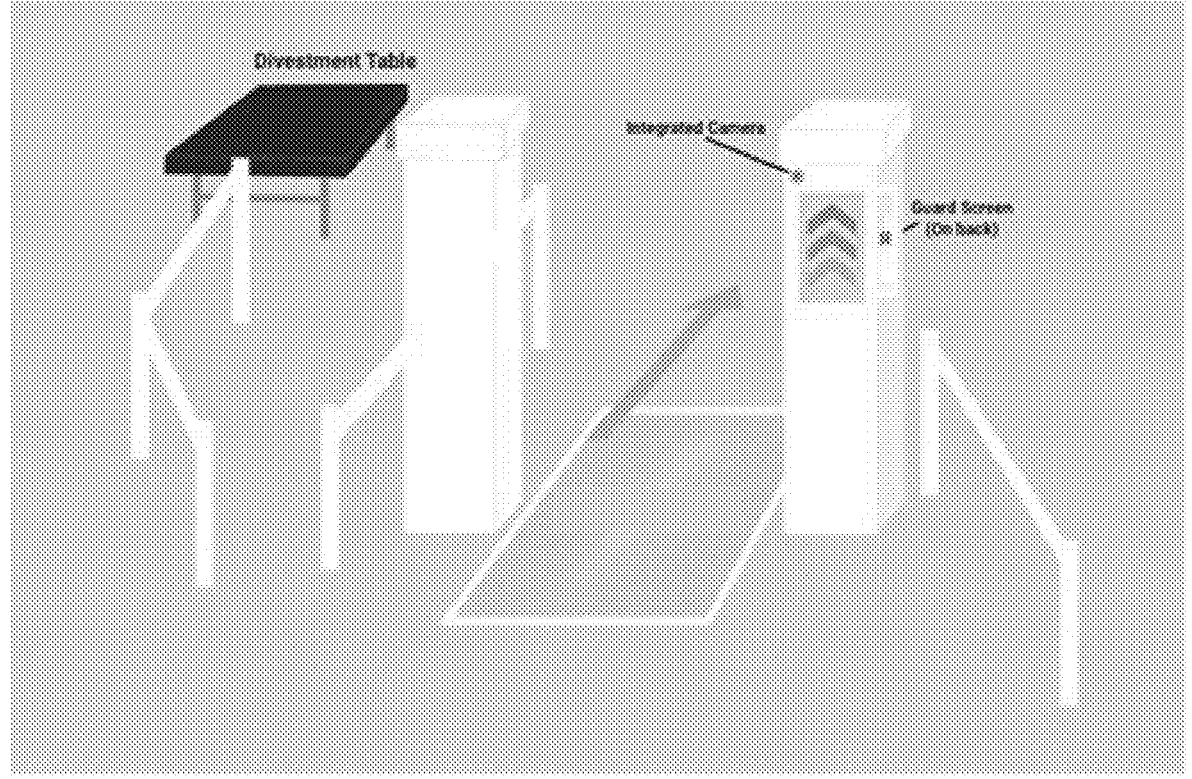

FIGS. 1A-1C are diagrams illustrating an exemplary threat detection system deployed in planter boxes. According to these figures, planter boxes are deployed at the entrance to an office and/or a pair of pillars to control entry. A pair of planter box columns are placed sufficiently far apart (i.e., 2 meters).

Decorative plants, either fake or real, are placed on the planter boxes. The planter boxes or planter box columns are connected via concealed wires where a cover is placed on top. The concealed wires provide power and Ethernet connection between both columns. In further embodiments, the concealed wires can be replaced with a wireless connection or another type of data connection. The planter box columns contain sensors to implement a threat detection system. At least one of the columns may also have a power cord and/or connection to the internet.

FIG. 1B is a diagram of an exemplary threat detection system deployed in planter boxes in a front entrance of a building. As seen in FIG. 1B, two planter box columns are placed by the front door in a building. A person can be seen entering the building, walking through these planter box columns.

A threat detection system using a multi-sensor gateway (MSG), such as the Xtract One PATSCAN MSG offers detection of concealed weapons on people and in bags using artificial intelligence (AI) and/or machine learning (ML) coupled with magnetic moment techniques. The multi-sensor gateway (MSG) allows for the discovery of a "weapon signature" (i.e., object shape such as handguns, rifles, knives or bombs). Its configuration can detect and identify where on the individual's body or bag the metal threat object resides.

As seen in FIG. 1B, the MSG threat detection system can detect a concealed object (i.e., round circle in image) and may infer that this can be a weapon threat. This information is sent to a central processor and is provided to an operator, to security officers or to police enforcement. Further, the MSG threat detection system may be connected to an alert system where lights and sounds can be triggered once a threat is detected.

FIG. 1C is a diagram illustrating a standalone exemplary threat detection system. According to FIG. 1C the standalone threat detection system consists of two pillars. One of these pillars will have an integrated camera, a display screen and a guard screen (not shown). There may also be arrows to indicate the direction of traffic flow. Close by would be a divestment table where security personnel may search objects of the patron (e.g., backpack, handbag, laptop bags, etc.).

Figure 2:
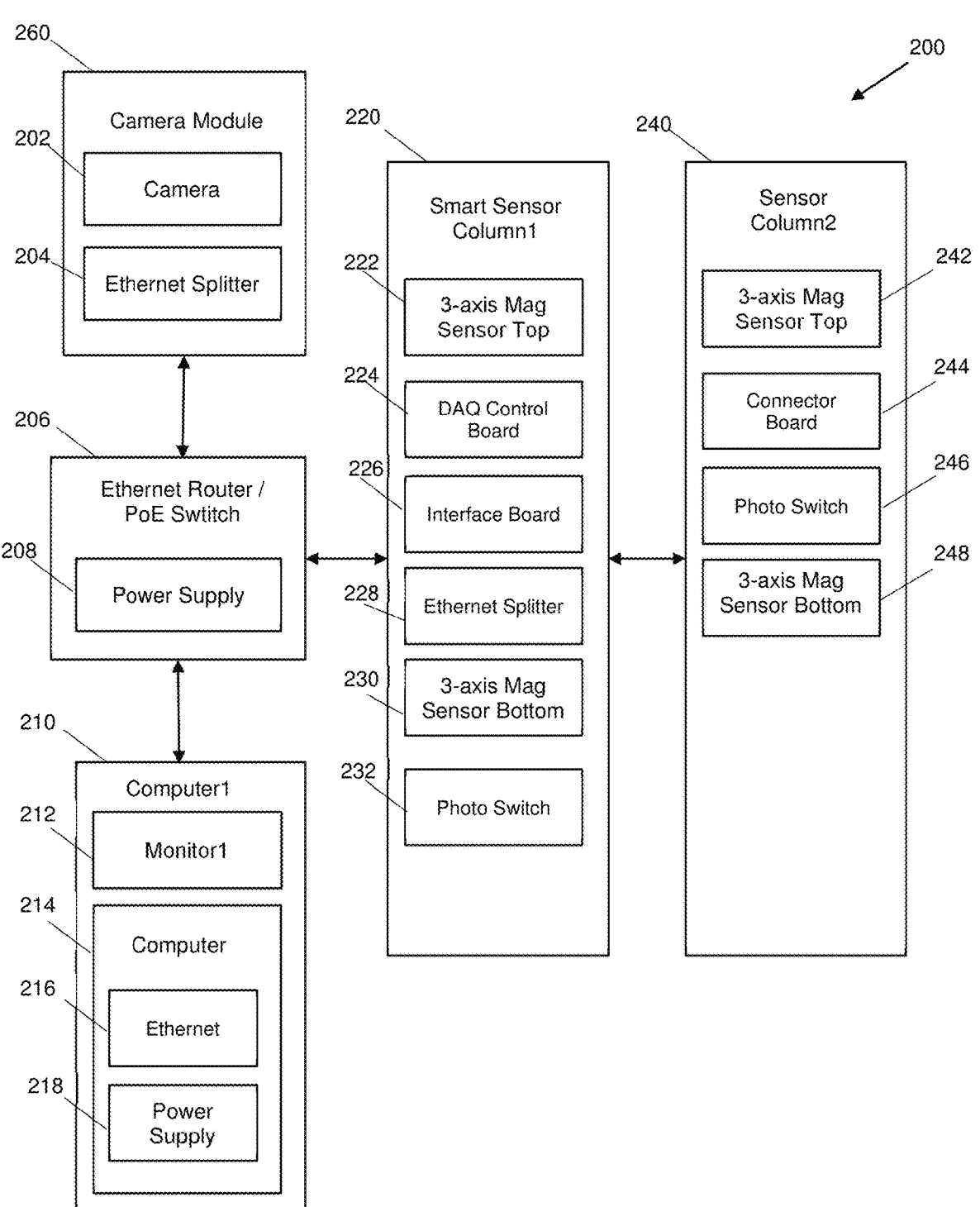
FIG. 2 is a block diagram illustrating an exemplary threat detection system.

FIG. 2 is a block diagram illustrating an exemplary threat detection system. According to FIG. 2, the threat detection system 200 consists of a first sensor column 220 (i.e., smart column) includes a photoelectric sensor 232 (e.g., photo switch), a power supply 232, a computer control board 224 (e.g., a LabJack DAQ board), an interface board 226, a plurality of 3-axis magnetic sensors 222, 230. Connection interfaces for ethernet router 206, ethernet splitters 204, 228, and ethernet PoE (power of Ethernet) is also provided. Photoelectric sensor 232 may also include a photo emitter.

While Ethernet, and in particular powered Ethernet provides many advantages in reliably connecting the columns to the data analysis computer, several other power and connectivity options are available that would have a different set of advantages; for example connections to route the data could be WiFi® connections, BlueTooth® connections, short range wireless, WAN or cellular connections. In addition, power can be supplied to the columns via several means, including direct AC power connections, PoE, 12V DC connections, or battery connections. In future embodiments, first sensor column 220 may incorporate a computer processor.

The threat detection system 200 also consists of a second sensor column 240 comprising a second photoelectric sensor 246 (e.g., photo switch), a connector board 244 and a plurality of 3-axis magnetic sensors 242 and 248. A plurality of wires is provided to connect the interface board 226 of the first column 220 with the connector board 244 of the second column 240. Photoelectric sensors or photo switches 246, 232 are optical sensors that detect motion when people pass through. In further embodiments, sensor columns 220, 240 may include dedicated power supplies.

Attached to the first smart sensor column 220 includes an ethernet router and PoE (Power over Ethernet) switch 206, which can be connected to a 48V power supply 208, a computer system 210 and a camera module 260. The computer system 210 consists of monitor 212 and computer 214 which may be a laptop or small size computer unit. Computer 214 further comprises a computer processor (not shown), power supply 218 and ethernet connection 216. Camera module 260 consists of one or more cameras 202 and ethernet splitter 204.

In further embodiments, the computer 210, 214 may be replaced by a processor housed within the sensor columns 220, 240. In further embodiments, the ethernet connection of threat detection system 200 may be replaced with a Bluetooth®, cellular or WiFI® wireless connection, thus removing the need for running ethernet cables.

According to the disclosure, a hybrid multi-sensor gateway (MSG) system combines the two MSG system transmitters and receivers into a single gateway. The hybrid system consists of the backbone of the system with an active transmitter loop which induces eddy currents to flow within conductive targets. Acquisition parameters such as transmitter pulse base frequency, waveform shape, ramp-time and peak current etc. can be modified and tuned to the specific applications and expected targets.

MSG sensors are added to the system. MSG sensors may include inductive coil sensors and are wound around a very high susceptibility material which greatly increases the sensitivity of the sensors. Furthermore, MSG sensors are tuned for a much lower frequency, typically recording responses in the 0.3-30 Hz frequency range which is needed to measure the low frequency passive response as magnetized objects pass through the gateway. Different embodiments of the hybrid system are possible including or not including the addition of the static magnetic array.

Further embodiments of the system are possible to combine transmitters and two types of receivers for getting usable data off the MSG sensors while still using the active 2.0 transmitter. The first option is to leverage hardware filters and non-overlapping frequency ranges of the components. By using a higher frequency spectrum of the active transmitters (a few ms for a transmitter pulse) and the low frequency 0.3 Hz-10 Hz range of the 1.0 sensors, one can create frequency bands that don't overlap significantly so any active source pulse may be filtered out. Alternative embodiments are possible, where longer off-times are created for the MSG transmitter pulses—in the long-off time regions between pulses, clean passive MSG data could be collected with those sensors.

Alternative embodiments are also possible, where the MSG transmitter is only fired during specific parts of the walk-through likely triggered off optical sensors or motion information. Various potential options include collecting active data at the midpoint of the walkthrough or first/second half of the walk through, while collecting passive data through the other portion of the walkthrough.

New use cases for the gateway systems are abundant, but some specific examples could include the detection of electronics and other recording devices for shows and entertainment events so that no audio or video recordings of the events would be possible. Additional electronics use cases include security and defense situations, where banned electronic and recording devices could not be brought into classified or sensitive areas within a building.

Additionally, sensitive or digital recording devices could also not be removed from classified areas. Further electronic specific use cases include the ability to detect and discriminate between different items such as electronics for theft from retail and warehouse applications, without the need to manually place RF type tags on each piece of merchandise.

Additional gateway flexibility could be added to deploy multiple detection models simultaneously, or to incorporate external information from other sensors or data sources and use this to either change the parameters of the machine learning models (such as for example sensitivity or other parameters) or to determine which threat models are executed at run-time as the patron walks through the gateway.

An additional embodiment would be to use video or computer vision technology, including for example uniform clothing detection or facial recognition to allow security guards or other pre-screened individuals to pass through the gate. This could include the integration of vision technology to identify and allow high value clients such as VIP and celebrities to pass unhindered through the gateway.

According to the disclosure, an adaptive transmitter is disclosed for object detection in a multi-sensor gateway. The adaptive transmitter enables changing power levels to meet health and safety requirements based on proximity information.

Figure 3:
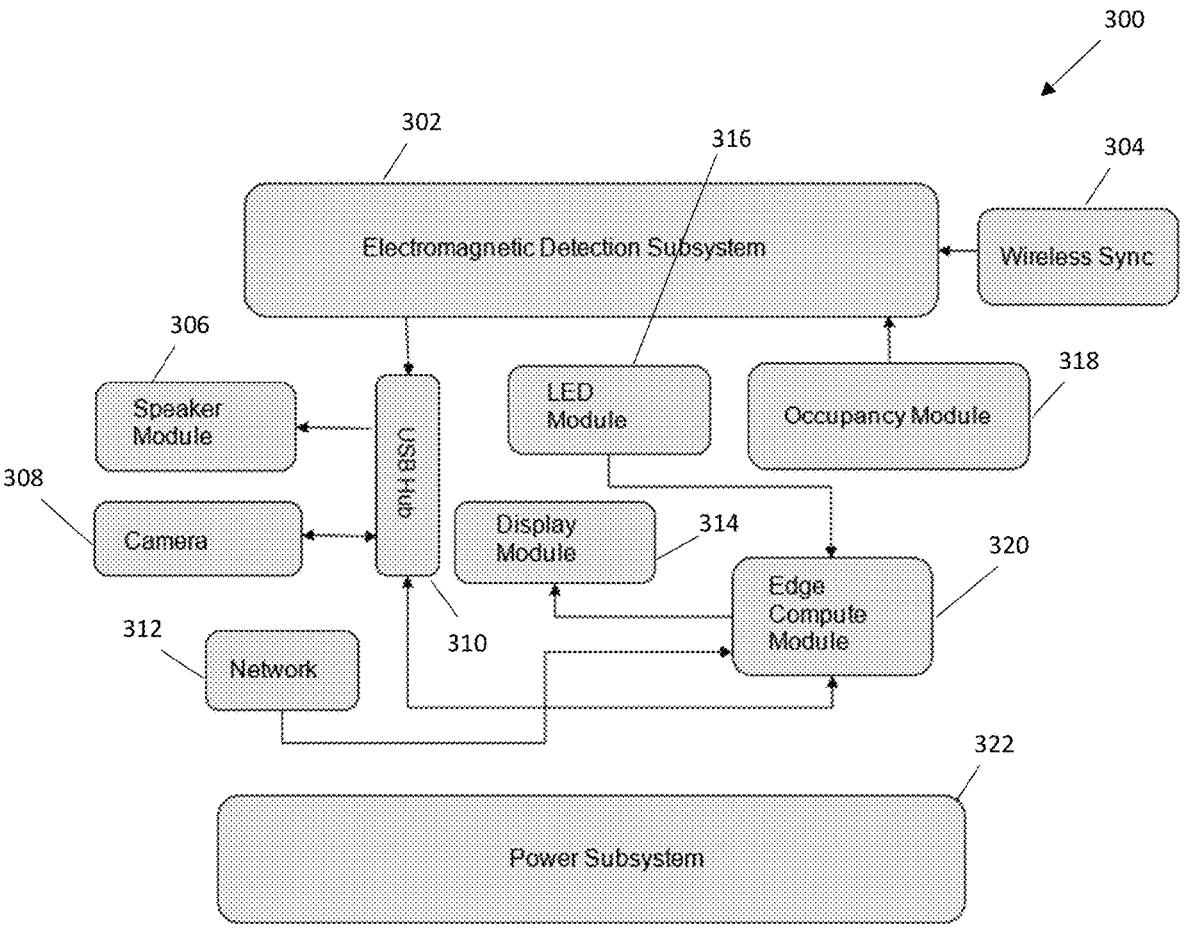
FIG. 3 is a further block diagram illustrating a further embodiment of a threat detection system.

FIG. 3 is a further block diagram illustrating a further embodiment of a threat detection system. According to FIG. 3, the further threat detection system 300 comprises some or all of an Electromagnetic Detection Subsystem (EDS) 302, a wireless synch module 304, a speaker module 306, a camera or camera module 308, a USB hub 310, a network or network switch 312, a display module 314, a LED module 316, an occupancy module 318, an EDGE compute (or computer) module 320 and a power subsystem 322.

According to FIG. 3, the central components of the threat detection system 300 include the USB hub 310 and the Edge compute module 320. The EDS 302, speaker module 306, camera module 308 and Edge compute module 320 all connect to the USB hub 310. Furthermore, the LED module 316, display module 314 and network switch 312 connect to the Edge compute module 320.

According to FIG. 3, the display module 314 can be a removable display module such as a removable tablet. According to FIG. 4, the wireless sync module 304 is configured to enable wireless synchronization of the transmission pulse between two pillars of one lane, or multiple lanes.

Figure 4:
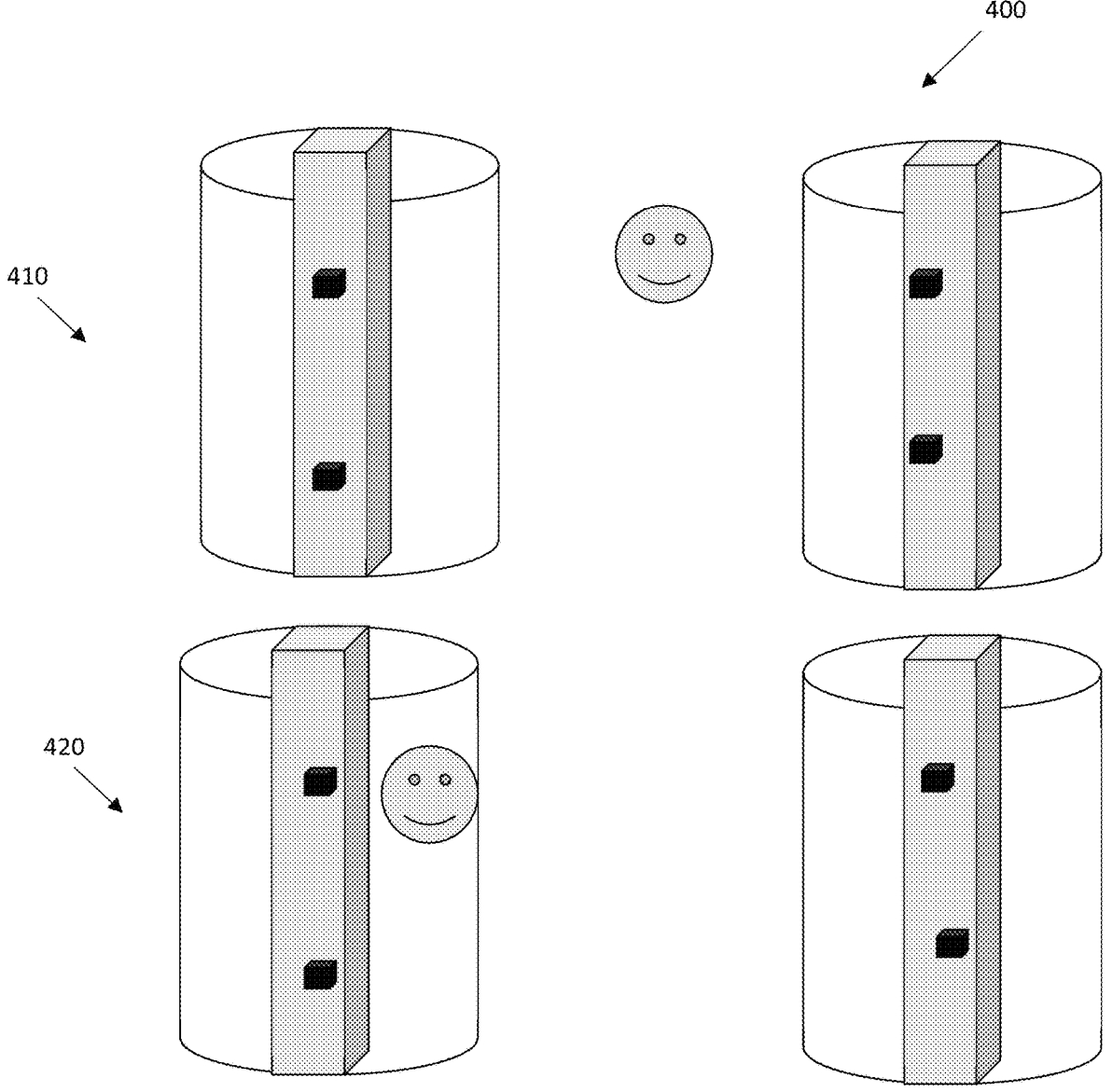
FIG. 4 is a block diagram illustrating a further exemplary threat detection system.

FIG. 4 is a diagram illustrating an exemplary embodiment of an adaptive transmitter configuration. According to FIG. 4, an embodiment of the adaptive transmitter configuration 400 is shown in a two-mode configuration. Rectangular prisms represent the gateway pillars; smiley faces represent a patron passing through the pillars; black cubes=proximity sensors or other sensors capable of determining distance information; and yellow cylinders=the boundary of a two-zone proximity boundary.

According to the FIG. 4, in the top panel 410, the patron passes through the center of the gate and always stays far enough away from the transmitters such that the transmitter could always operate in a high field configuration and remain under the appropriate health and safety levels.

According to the FIG. 4, in the bottom panel 420, the patron moves close to a pillar and enters the second proximity boundary, and therefore the system would automatically switch to the lower power setting, for the left pillar (the power level on the right pillar could also potentially be changed or increased), to remain within the appropriate levels (general or operational health guidelines, etc.).

According to FIG. 4, the field at a fixed position within the gateway is influenced by the number, positions and sizes of the transmitter loops, the amplitude and waveform of the transmitter current driven through the loop and the number of turns of wire that the transmitter loop is constructed from. Based on information from proximity sensors or other positional related information, one of all of these variables could be changed to influence the field strength and geometry within the gate. For example, only the amplitude of the current with one single pillar (for example the left pillar) could be changed with all of the other parameters remaining constant.

According to FIG. 4, another option would be that the current amplitude within the first left hand pillar could be changed and the current within the second right hand pillar also changed based on the proximity information and the desire to create a certain field geometry. Since the field within the gateway will be the sum of the fields produced by each transmitter loop, the current from an arbitrary number of transmitter loops can be modulated to influence the field within the gateway.

Furthermore, it is possible to have a number of transmitter loops attached to each pillar with a different number of wire windings for the different transmitter loops (for example 5 turns for a lower power transmitter loop and 20 turns for a higher power transmitter loop). The ability to have different loops for different power levels may be desirable to have a control of the field strengths over a larger spatial volume within the gateway. The waveform and shape of the transmitter pulse could also be changed depending on the position of the patron within the gateway and distance to specific transmitter loops. The current and waveform could be changed continuously as the patron passes through the gate, or using discrete steps as the patron moves within certain discrete positions within the gateway and transmitter loop offsets.

According to the disclosure, the system comprises the following:

Using proximity sensors to determine where the patron is with respect to the source (static magnetics or transmitter loop).

Optimizing source strength and possible direction based on proximity to the source and computing source strength such that field strength (and potentially orientation) is optimal but still meets health and safety requirements.

Field strength at patron distance can be easily calculated either analytically or numerically based on distance and source parameters.

Field strength could be adaptive in a continuous real-time mode based on proximity. Other embodiments include two or more discrete power modes, and the high and low mode power levels are switched depending on patron distance to the pillar or source. For example, if the patron comes close to a pillar or source, the power level would automatically switch from high power level to low power level.

Static field from magnetics can be replaced by static current from transmitter loop for MSG Additional sensors could be used to detect what type of patron is passing through the gateway and power levels adjusted accordingly. For example, height or facial recognition used to detect children and adjust power levels down.

Power levels may be changed for elderly people or people in wheelchairs.

Many different proximity sensors are possible to detect distance to source and track the patron offset as they pass through the gateway.

Proximity sensors can be combined with other analytics such a posture, gait or other computer vision or radar analysis.

Could work for static, frequency domain and time domain sources.

Can work for sources in the pillar, floor, ceiling, arch etc.

Onboard cameras or proximity sensors pointing towards the patron direction can give an estimate of how many people are entering the gateway.

If there are no patrons in view, no current flows through the transmission loop, or current is sent through at a lower frequency rate to reduce power consumption. Once patrons are detected by the cameras or proximity sensors, the transmission loop can fire at its regular frequency.

According to the disclosure, the system is configured to run on applications in different modes based on health and safety and proximity to the source. Furthermore, the applications are for object detection vs earth imaging or other uses.

According to the disclosure, if a handheld electromagnet (EM) probe is used to walk through the gateway, one could see the power levels switching at different positions though the gateway. Furthermore, if the measured power level from a portable probe were to remain fairly constant as an individual traversed through the gateway, one would know that the system would be modulating the power level as the patron moves, since without power modulation one would expect to see a geometric field strength related change as the patron traversed through the gateway.

According to further embodiments of the disclosure, battery lifetime can be measured for an hour with heavy or light presence of patrons in the gateway.

According to further embodiments of the disclosure, the gateway further comprises the ability to change the power levels by examining the first part of the walkthrough data time-series. It is possible to enter a low power usage state to preserve power as much as possible. In this configuration, the first part of the walkthrough is analyzed and once there is confidence in the classification result, one can reduce the power consumption so as not to use as much power in the remaining part of the walkthrough. Thus, one can trade-off detection capability slightly for power saving. This is a similar concept to extended battery saver mode on a mobile smartphone when the phone goes under a certain threshold of battery life (e.g., 15%).

According to the disclosure, a multi-sensor gateway apparatus configured for object detection to modulate power levels to meet health and safety requirements based on proximity information is disclosed. The gateway apparatus comprises a first pillar having a plurality of first sensors, a second pillar having a plurality of second sensors, a printed circuit board (PCB) on the first or second pillar, configured to support the plurality of sensors, a platform computer server and processor configured to receive data and process the data and one or more adaptive transmitters on the first or second pillars configured for changing power levels to meet health and safety requirements based on proximity information provided by the first or second sensors. The adaptive transmitters are placed on the first and second pillars using an adaptive transmitter configuration.

According to the disclosure, the adaptive transmitters are configured to operate in a two mode power level configuration whereby a patron passes through the first and second pillars and stays far enough away from the transmitters, the transmitters operate in a high field configuration and remain under appropriate health and safety levels in a first mode and the patron moves close to the pillar and enters a second proximity boundary, the apparatus switching to a lower power setting to remain within the appropriate health guidelines, in a second mode.

According to the disclosure, the apparatus switching to lower power setting is automatic. A two-mode power level configuration can be extended to a continuous mode configuration where the power levels are adjusted dynamically. The two-mode power level configuration is configured to reduce power consumption and prolong battery lifetime.

According to the disclosure, the two-mode configuration further comprises if there are no patrons in view, no current flows through the transmission loop, or current is sent through at a lower frequency rate to reduce power consumption and once patrons are detected by the cameras or proximity sensors, the transmission loop can fire at its regular frequency.

According to the disclosure, the apparatus is configured to intelligently detect the presence of patrons and optimize the transmission current through the transmission loop based on the amount of patrons present. The 1st or 2nd sensors of the apparatus further comprising proximity sensors to determine the location of the patron with respect to the source field. The source further comprising static magnetic field or transmitter loop field According to the disclosure, the apparatus further comprises optimizing the source strength and possible direction based on proximity to the source and compute source strength such that field strength and orientation is optimal but still meets health and safety requirements. The field strength of the patron distance can be calculated either analytically or numerically based on distance and source parameters. The field strength could either be adaptive in a continuous real-time mode based on proximity.

According to the disclosure, two or more discrete power modes, and the high and low mode power levels are switched depending on patron distance to the pillar or source. The static field from magnetics can be replaced by static current from transmitter loop for the multiple sensor gateway apparatus.

According to the disclosure, additional sensors could be used to detect what type of patron is passing through the gateway and power levels adjusted accordingly. For example, height or facial recognition is used to detect children and adjust power levels down.

According to the disclosure, different proximity sensors are possible to detect distance to source and track the patron offset as they pass through the gateway. The proximity sensors can be combined with other analytics such posture, gait or other computer vision or radar analysis.

According to the disclosure, the system could work for static, frequency domain and time domain sources. The system may work for sources in the pillar, floor, ceiling and arches as an example.

According to the disclosure, onboard cameras or proximity sensors pointing towards the patron direction can give an estimate of how many people are entering the gateway.

According to the disclosure, a computer-implemented method for object detection, using a computer processor and a multi-sensor gateway system to meet health and safety requirements based on proximity information. the method comprising the steps of providing a first pillar having a plurality of first sensors, providing a second pillar having a plurality of second sensors, providing a platform computer server and processor configured to receive data and process the data, providing a printed circuit board (PCB) on the first or second pillar, configured to support the plurality of sensors, providing one or more adaptive transmitters on the first or second pillars configured for changing power levels to meet health and safety requirements based on proximity information provided by the first or second sensors, receiving data from the plurality of sensors, analyzing the data using the acquisition parameters.

According to the disclosure, the adaptive transmitters are configured to operate in a two-mode power level configuration whereby a patron passes through the first and second pillars and stays far enough away from the transmitters, the transmitters operate in a high field configuration and remain under appropriate health and safety levels in a first mode and the patron moves close to the pillar and enters a second proximity boundary, the apparatus switching to a lower power setting to remain within the appropriate health guidelines, in a second mode. The adaptive transmitters are placed on the first and second pillars using an adaptive transmitter configuration.

According to the disclosure, the method further comprises the step of transmitting the data to operations or to a security personnel. The step of switching to a lower power setting of the method is automatic. A two mode power level configuration can be extended to a continuous mode configuration where the power levels are adjusted dynamically. The two-mode power level configuration is configured to reduce power consumption and prolong battery lifetime.

According to the disclosure of the method, the two-mode configuration further comprises If there are no patrons in view, no current flows through the transmission loop, or current is sent through at a lower frequency rate to reduce power consumption and once patrons are detected by the cameras or proximity sensors, the transmission loop can fire at its regular frequency.

According to the disclosure, the method is configured to intelligently detect the presence of patrons and is optimized the transmission current through the transmission loop based on the amount of patrons present. The 1st or 2nd sensors of the method further comprising proximity sensors to determine the location of the patron with respect to the source. The source further comprising static magnetic field or transmitter loop field, wherein the method further comprises optimizing the source strength and possible direction based on proximity to the source and compute source strength such that field strength and orientation is optimal but still meets health and safety requirements.

According to the disclosure, the field strength at patron distance of the method can be calculated either analytically or numerically based on distance and source parameters. The field strength could either be adaptive in a continuous real-time mode based on proximity.

According to the disclosure, other embodiments include two or more discrete power modes, and the high and low mode power levels are switched depending on patron distance to the pillar or source. The static field from magnetics can be replaced by static current from transmitter loop for the multiple sensor gateway.

According to the disclosure, additional sensors of the method could be used to detect what type of patron is passing through the gateway and power levels adjusted accordingly. For example, height or facial recognition is used to detect children and adjust power levels down.

According to the disclosure, different proximity sensors of the method are possible to detect distance to source and track the patron offset as they pass through the gateway. Proximity sensors can be combined with other analytics such posture, gait or other computer vision or radar analysis.

According to the disclosure, the method could work for static, frequency domain and time domain sources. The method could also work for sources in the pillar, floor, ceiling and arches. Furthermore, onboard cameras or proximity sensors pointing towards the patron direction can give an estimate of how many people are entering the gateway for the method.

The functions described herein may be stored as one or more instructions on a processor-readable or computer-readable medium. The term "computer-readable medium" refers to any available medium that can be accessed by a computer or processor. By way of example, and not limitation, such a medium may comprise RAM, ROM, EEPROM, flash memory, CD-ROM or other optical disk storage, magnetic disk storage or other magnetic storage devices, or any other medium that can be used to store desired program code in the form of instructions or data structures and that can be accessed by a computer. It should be noted that a computer-readable medium may be tangible and non-transitory. As used herein, the term "code" may refer to software, instructions, code or data that is/are executable by a computing device or processor. A "module" can be considered as a processor executing computer-readable code.

A processor as described herein can be a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, or microcontroller, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. In some embodiments, a processor can be a graphics processing unit (GPU). The parallel processing capabilities of GPUs can reduce the amount of time for training and using neural networks (and other machine learning models) compared to central processing units (CPUs). In some embodiments, a processor can be an ASIC including dedicated machine learning circuitry custom-build for one or both of model training and model inference.

The disclosed or illustrated tasks can be distributed across multiple processors or computing devices of a computer system, including computing devices that are geographically distributed. The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

As used herein, the term "plurality" denotes two or more. For example, a plurality of components indicates two or more components. The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on." While the foregoing written description of the system enables one of ordinary skill to make and use what is considered presently to be the best mode thereof, those of ordinary skill will understand and appreciate the existence of variations, combinations, and equivalents of the specific embodiment, method, and examples herein. The system should therefore not be limited by the above-described embodiment, method, and examples, but by all embodiments and methods within the scope and spirit of the system. Thus, the present disclosure is not intended to be limited to the implementations shown herein but is to be accorded the widest scope consistent with the principles and novel features disclosed herein.

What is claimed is:

1. A multi-sensor gateway apparatus configured for object detection to modulate power levels to meet health and safety requirements based on proximity information, the gateway apparatus comprising:

a first pillar having a plurality of first sensors;

a second pillar having a plurality of second sensors;

a printed circuit board (PCB) on the first or second pillar, configured to support the plurality of sensors;

a platform computer server and processor configured to receive data and process the data; and one or more adaptive transmitters on the first or second pillars configured for changing power levels to meet health and safety requirements based on proximity information provided by the first or second sensors;

wherein the adaptive transmitters are placed on the first and second pillars using an adaptive transmitter configuration;

wherein the adaptive transmitters are configured to operate in a two-mode power level configuration whereby:

a patron passes through the first and second pillars and stays far enough away from the transmitters, the transmitters operate in a high field configuration and remain under appropriate health and safety levels in a first mode; and the patron moves close to the first and second pillars and enters a second proximity boundary, the apparatus switching to a lower power setting to remain within the appropriate health guidelines, in a second mode.

2. The apparatus of claim 1 wherein the apparatus switching to lower power setting is automatic.

3. The apparatus of claim 1 wherein the two-mode power level configuration can be extended to a continuous mode configuration where the power levels are adjusted dynamically.

4. The apparatus of claim 3 wherein two-mode power level configuration configured to reduce power consumption and prolong battery lifetime.

5. The apparatus of claim 3 wherein the two-mode configuration further comprises:

If there are no patrons in view, no current flows through a transmission loop, or current is sent through at a lower frequency rate to reduce power consumption; and once patrons are detected by a camera or a proximity sensor, the transmission loop can fire at its regular frequency.

6. The apparatus of claim 5 wherein the apparatus is configured to intelligently detect the presence of patrons and optimize the transmission current through the transmission loop based on the amount of patrons present.

7. The apparatus of claim 1 wherein the first or second sensors further comprises proximity sensors to determine the location of the patron with respect to a source field.

8. The apparatus of claim 7 wherein the source further comprises a static magnetic field or a transmitter loop field.

9. The apparatus of claim 1 wherein the apparatus further comprises optimizing a source strength and possible direction based on proximity to the source and compute source strength such that field strength and orientation is optimal but still meets health and safety requirements.

10. The apparatus of claim 9 wherein the field strength of the patron distance can be calculated either analytically or numerically based on distance and source parameters.

11. The apparatus of claim 9 wherein the field strength could either be adaptive in a continuous real-time mode based on proximity.

12. A computer-implemented method for object detection, using a computer processor and a multi-sensor gateway system to meet health and safety requirements based on proximity information, the method comprising the steps of:

providing a first pillar having a plurality of first sensors;

providing a second pillar having a plurality of second sensors;

providing a platform computer server and processor configured to receive data and process the data;

providing a printed circuit board (PCB) on the first or second pillar, configured to support the plurality of sensors;

providing one or more adaptive transmitters on the first or second pillars configured for changing power levels to meet health and safety requirements based on proximity information provided by the first or second sensors;

receiving data from the plurality of sensors;

analyzing the data using the acquisition parameters; and wherein the adaptive transmitters are configured to operate in a two-mode power level configuration whereby:

a patron passes through the first and second pillars and stays far enough away from the transmitters, the transmitters operate in a high field configuration and remain under appropriate health and safety levels in a first mode; and the patron moves close to the first and second pillars and enters a second proximity boundary, the apparatus switching to a lower power setting to remain within the appropriate health guidelines, in a second mode;

wherein the adaptive transmitters are placed on the first and second pillars using an adaptive transmitter configuration.

13. The method of claim 12 further comprising the step of transmitting the data to operations or to a security personnel.

14. The method of claim 12 wherein the step of switching to a lower power setting is automatic.

15. The method of claim 12 further comprising a two-mode power level configuration including a continuous mode configuration where the power levels are adjusted dynamically.

16. The method of claim 15 wherein the two-mode power level configuration is configured to reduce power consumption and prolong battery lifetime.

17. The method of claim 15 wherein the two-mode configuration further comprises:

If there are no patrons in view, no current flows through a transmission loop, or current is sent through at a lower frequency rate to reduce power consumption;

once patrons are detected by a camera or a proximity sensor, the transmission loop can fire at its regular frequency.

18. The method of claim 17 wherein the method is configured to intelligently detect the presence of patrons and optimize the transmission current through the transmission loop based on the amount of patrons present.

19. The method of claim 12 wherein the first or second sensors further comprising proximity sensors to determine the location of the patron with respect to a source.

20. The method of claim 19 wherein the source further comprising static magnetic field or transmitter loop field, wherein the method further comprises optimizing a source strength and possible direction based on proximity to the source and compute source strength such that field strength and orientation is optimal but still meets health and safety requirements.

* * * * *